United States Patent [19]
Pavlopoulos et al.

[11] Patent Number: 4,799,230
[45] Date of Patent: Jan. 17, 1989

[54] LASER DYES DERIVED FROM BIMANES

[75] Inventors: Theodore G. Pavlopoulos, San Diego, Calif.; Joseph H. Boyer, New Orleans, La.

[73] Assignee: The United States of America as represented by the Secretary of the Navy, Washington, D.C.

[21] Appl. No.: 125,646

[22] Filed: Nov. 20, 1987

[51] Int. Cl.$^4$ .............................................. H01S 3/20
[52] U.S. Cl. ........................................ 372/53; 372/54
[58] Field of Search ................. 378/53, 39; 252/301.17

[56] References Cited

PUBLICATIONS

Pavlopoulos et al., "Laser Action from Syn–(Methyl, Chloro) Bimane"; J. Appl. Phys. 62(1), 1 Jul. 1987.
Pavlopoulos et al.; "Laser Action from Syn–(Methyl, Methyl) Bimane"; J. Appl. Phys. 60(11), 1 Dec. 1986.
Edward M. Kosower & Barak Pazhenchevski in the article entitled "Journal of American Chemical Society"/100:20/Sep. 27, 1978.
Edward M. Kosower & Barak Pazhenchevski in the article entitled "Journal of American Chemical Society"/102/Nov. 15, 1980.
T. G. Pavlopoulos, Spectrochim, Acta, 42A, 47 (1986).

Primary Examiner—Leon Scott, Jr.
Attorney, Agent, or Firm—Thomas Glenn Keough; Harvey Fendelman

[57] ABSTRACT

A new class of laser dyes has a lasing compound syn ($R_1$, $R_2$) bismanes that shows efficient laser action under flashlamp excitation. In the laser action spectral region there is little or no triplet-triplet absorption so that laser efficiencies in the range of 1 to 3 percent can be provided. Good solubility in many solvents (especially water) good photochemical stability and simplicity of preparation are inherent in this new lasing media.

20 Claims, 1 Drawing Sheet

LASER DYES DERIVED FROM BIMANES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Currently lasers having energy outputs, high efficiency, high repetition rates and being tunable are in great demand for military, industrial and scientific applications. While process has been made in the development of a laser having such properties, none has been found which answer all the these needs and operate in the near UV/visible/near IR region of the spectrum. Dyer lasers operating with improved laser dyes appear to offer some potential to meet the above requirements.

Ever since the lasing action of organic dyes was observed, intense efforts have been made to develop this field. The main reasons for this development have been the unique feature of dye laser to be tunable over a wide range of wavelengths. In addition, other advantages of dye lasers include the fact that dye lasers are liquid lasers and, hence, have a high optical quality of the active medium is implied and a high pulse repetition rate is possible because of the simplicity of cooling. Another advantage is that the cost preparing the active medium (the laser dye and solvent) is less than with solid state lasers. On the minus side however, laser dyes have demonstrated only moderator energies and a photodecomposition which limits their useful life. Another drawback to laser dyes is their requirement for an excitation flashlamp that has steep risetimes of about 1 microsecond and less to assure the laser action. As a consequence, flashlamps meeting this stringent requirement are difficult to build for operation above 500 Joules.

The present method of identifying organic dyes that have satisfactory laser action is largely one of trial and error. Thousands of organic compounds which show strong fluorescence have been synthesized and are commercially available. Fluorescence in this context is a spontaneous random emission. However, only a few show laser action, a coherent radiation, under flashlamp excitation. Most of the disadvantages in presently available laser dyes are closely related with the accumulation of dye molecules in their triplet state due to intersystem crossing. These triplet state molecules in turn absorb the laser light more or less efficiently depending on the magnitude of their triplet state absorption and concentration. Triplet-triplet (T-T) absorption is not very small in all laser dyes presently commercially available.

Thus, a continuing need exists in the state-of-the-art for new laser dyes with further reduced T-T absorption in which the lower laser action threshold makes it possible to employ commercial flashlamps with slower risetimes. More usable UV light is used thereby, to result in more efficient dye laser operation and a more efficient conversion of the pumping energy is provided due to a reduced T-T absorption. In addition, the need exist for a more photochemically stable laser dye to assure long term reliable operation.

SUMMARY OF THE INVENTION

The present invention is directed to providing a laser medium in which the lasing compound is a syn-($R_1$, $R_2$) bimane in a solid, gaseous or liquid state. Suitable solvents for the liquid state typically include water or hexafluoroisopropanol, although others may be appropriate. A method of lasing in the violet to red spectral region relies on the optical pumping of a laser dye medium, syn-($R_1$, $R_2$, $R_3$, $R_4$) bimane, by flashlamp, laser or other means.

An object of the invention is to provide a new class of laser dyes based on the bimanes.

Still yet anther object is to provide a laser dye having a high efficiency of laser action.

Another object is to provide a laser dye having an improved photochemical stability.

Another object is to provide a laser dye which is water soluble.

Another object is to provide a new class of laser dyes having good solubility in many solvents including water, good photochemical stability and having a simplicity in preparation.

Another object of the invention is to provide for a laser dye media formed of a syn-($R_1$, $R_2$) bimane exhibiting reduced T-T absorption.

These and other objects of the invention will become more readily apparent from the ensuing specification and claims when taken in conjunction with the appended drawings.

DESCRIPTION OF THE PREFERRED EMBODIMENT

Figure 1A:
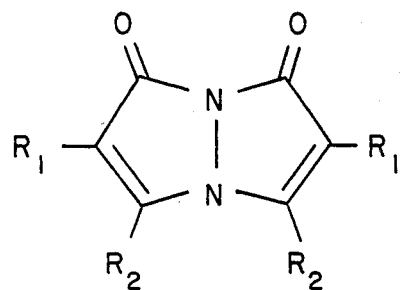
FIGS. 1a and 1b depict the syn bimane structures of the lasing media.
Figure 1B:
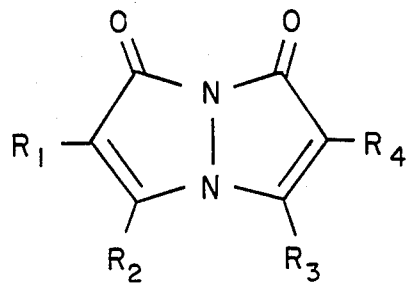

The Coumarin laser dyes have been the ones most widely used for the spectral region stretching from 440 to 550 nm. However, the Coumarin laser dyes have a rather poor photochemical stability and their efficiencies are about 0.5% and lower. Throughout, the simplified structures shown in FIG. 1a, syn-($R_1$, $R_2$) bimane or syn-($R_1$, $R_2$)B will be used. This does not imply a limitation of the more general case of FIG. 1b, syn-($R_1$, $R_2$, $R_3$, $R_4$)bimane.

In accordance with this inventive concept more stable and efficient laser dyes are feasible, for example, laser action from the syn-(methyl, methyl) biame which stands for 3,4,6,7 tetraethyl-1,5-diazabicyclo [3.3.0] octa-3,6-diene-2,8-dion[syn-($CH_3$, $CH_3$)B for short]. This new heterocyclic molecule was first reported by Kosower, Pazhenchevski, and Hershkowitz in their paper appearing in the *Journal of the American Chemical Society* 100, p 6516 (1978). The observation of strong and striking fluorescence properties, when illuminated by a UV lamp, as well as good photochemical stability, for those compounds was noted. Strong fluorescence (high quantum fluorescence yield) of organic compounds, which are not benzene derivatives, is rare. The quantum fluorescence yield of syn-($R_2$, $R_1$)B was noted by Kosower et al. to range from 0.7 to 0.9. The isomer anti-($R_2$, $R_1$) bimane is only weakly fluorescent.

Under flashlamp excitation the syn-(methyl, methyl) bimane provided laser action at 504 nm. This compound showed good photochemical stability under flashlamp excitation. The laser action properties of the new laser dye were compared with those of Coumarin 30 which shows laser action in the same spectral region as syn-(methyl, methyl) bimane. Although syn(methyl, methyl) bimane lased only 30% less efficient than did Coumarin 30, the photochemical stability more than compensated for this.

One property of the syn-bimanes is their remarkable dependence on the spectral location of their lowest energy absorption band (S-S) on the solvent employed. As a consequence, the spectral location of the fluorescence also is much dependent on the solvent chosen. For example, the fluorescence maximum for syn-(methyl, methyl) bimane, shifted from 420 nm in p-dioxane to 460 nm in ethanol to 480 nm in water. However, laser action was noted under flashlamp excitation from this same compound only when it was dissolved in water and later again, in a hexafluoroisopropanol solution. These were the solvents which caused the largest red shifts. The compound could be dissolve in plastics as a routine matter by technicians skilled in the art of material preparation. Such plastics in solid or liquid form are commercially available and are furnished with instructions on how to prepare the plastic. Transforming a compound from a solid to a gaseous form is routinely performed by technicians skilled in the art of chemical preparation. Generally, this is accomplished by putting the solid (the laser dye) into an optical cell. The cell is evacuated (air removed) by connecting it to a vacuum line. The solid in the cell is transformed into its gaseous form by heating the cell.

Compounds having the suitable properties for lasing in accordance with this inventive concept had two specific spectroscopic parameters that critically determined the laser action efficiency of flashlamp and cw laser pumped dye lasers: The first of these parameters is that there must be a high quantum fluorescence yield $Q_F$ and secondly, a low triplet-triplet (T-T) absorption over the fluorescence (laser action) spectral region of the laser dye.

Figure 2:
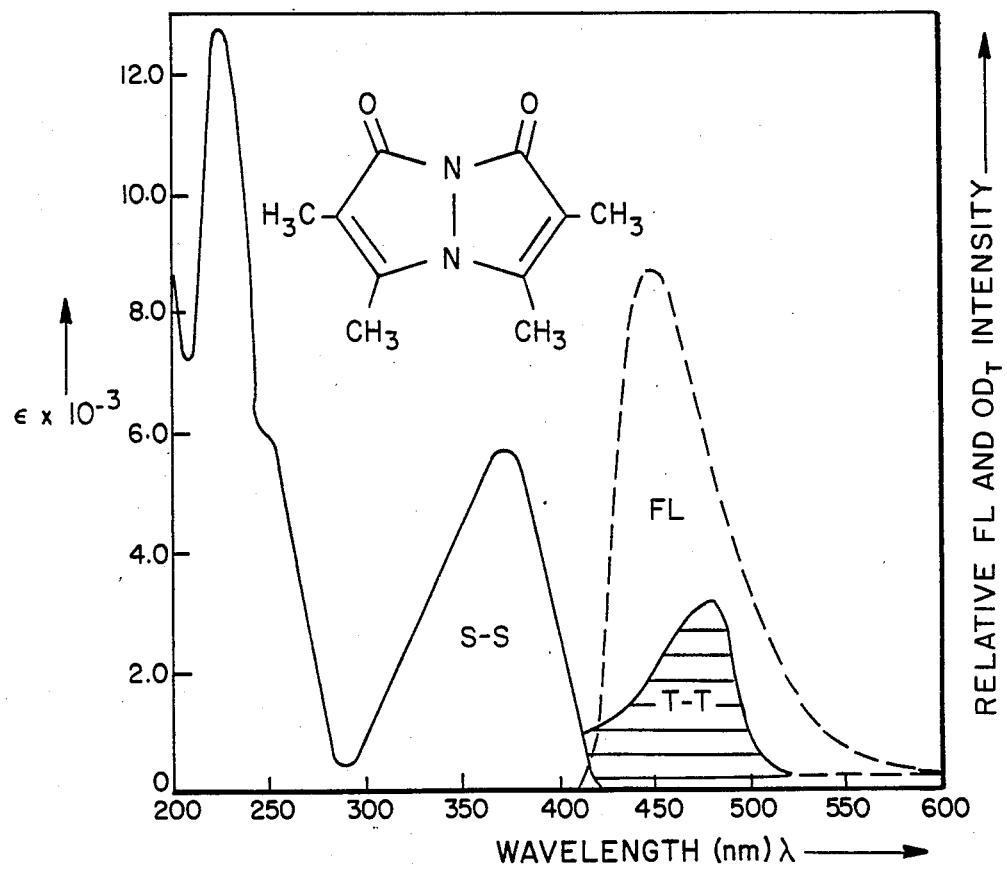
FIG. 2 shows the absorption (S-S), fluorescence FL and triplet-triplet (T-T) absorption of syn-($CH_3$, $CH_3$) B, ethanol/ethyl ether, 2:1 ratio. The T-T absorption spectrum was recorded at the temperature of liquid nitrogen.

The T-T absorption spectrum of syn-(methyl, methyl) bimane is depicted in FIG. 2 which also sets forth the absorption (S-S) and the fluorescence spectrum of syn-(methyl, methyl,) bimane dissolved in a 2:1 ratio of ethanol/ethyl ether. It should be noted that the T-T absorption spectra of organic compounds are measured at liquid/nitrogen temperatures to extend the lifetime of the triplet state molecules. For these measurements, the organic compound must be dissolved in a solvent which freezes in a clear, glasslike solid at liquid/nitrogen temperatures.

The equipment used to measure the absorption [singlet-singlet (S-S)], fluorescence and T-T absorption of syn-($CH_3$, $CH_3$)B was essentially the same as that used by Pavlopoulos and described by him in *Spectrochim. Acta*, 42A, 47 (1986). The excitation source for recording the T-T absorption spectrum relied upon the 351,356 nm lines of a Spectra-Physics kryptonion cw laser. A model number FX139C-2 flashlamp pumped dye laser marketed by E. G. & G was used for data collecting. The flashlamp produced pulses of approximately 200 ns risetime and 0 ns length at the half-width of the pulse. It delivered 2 Joules at 6.32 kV, 5 Joules at 10.0 kV, and 10 Joules at 14.14 kV. The dye laser was used in the nonflowing (static) mode. The dye cell was about 2.5 mm in diameter and 50 mm long, positioned in a single ellipsoidal cavity of small eccentricity. The intensity of the laser pulses, which were measured with a photomultiplier, were reduced by several Jenaer Glaswerk neutral-density filters and displayed on the screen of a Tektronix 7834 storage oscilloscope. The preparation of syn-(methyl, methyl) bimane was carried out from ethyl methylacetoacetate in three steps according to the process of Kosower and Pazhenchevsky appearing in their article in the *Journal of the American Chemical Society* 102, 4983 (1980). Purification of the bimane was assured by recrystallization from acetonitrile. Coumarin 30 was obtained from the Eastman Kodak Company and hexafluoroisopropanol was purchased from PCR.

As referred to above, the property which was most striking of the syn-bimanes is their remarkable dependence on the spectral location of their lowest-energy absorption band (S-S) on the solvent employed. Consequently, the spectral location of the fluorescence also is very much solvent dependent. For example, the fluorescence maximum for syn-($CH_3$, $CH_3$)B, shifts from 420 nm in p-dioxane to 460 nm in ethanol to 480 nm in water. However, laser action under flashlamp excitation for this compound was found only in water and hexasfluoroisopropanol solutions.

The T-T absorption spectra of organic compounds are measured at liquid-nitrogen temperatures to extend the lifetime of the triplet-state molecules. The syn-($CH_3$, $CH_3$)B is dissolved in the following solvents: ethanol/ethyl ether in a 2:1 ratio, 2-methyltetrahydrofuran, EPA, and n-butanol/isopentane in a 3:7 ratio. Syn-($CH_3$, $CH_3$)bimane showed a fluorescence intensity maximum in the blue region (450–460nm) of the spectrum in all of these glassy solvents. No glassy solvents were found in which the syn-($CH_3$, $CH_3$) bimane would exhibit blue/green (480 nm) fluorescence as in water and hexafluoroisopropanol.

Referring once again to the drawings, FIG. 2 shows the absorption (S-S), the T-T absorption and the fluorescence spectrum of syn-($CH_3$, $CH_3$)B dissolved in a 2:1 ratio ethanol/ethyl ether. It is apparent that some T-T absorption overlaps the fluorescence spectral region. The compound of FIG. 2 has a T-T absorption band located in the fluorescence region with its maximum at 490 nm. The intensity of this T-T absorption band drops rather rapidly toward the longer wavelengths. This would explain why the compounds showed laser action in the green spectral region and not in the blue spectral region.

The photostability under krypton-ion cw laser excitation at 351,356 nm of syn-($CH_3$, $CH_3$)B was remarkably good in the different glassy solvents. This photostability, when irradiated with 360 nm light, has been verified in the cited article by Kosower and Pazhenchevsky. This stability is in contrast to the popular Coumarin laser dyes where photodecomposition reduces measurement accuracy even while recording the T-T absorption spectra, note the above cited Pavlopoulos article.

Laser action from the syn-($CH_3$, $CH_3$)B was broadband at 504 nm, with a threshold at 9.6 kV, using a $5 \times 10^{-4}$ M solution in distilled water. A $2 \times 10^{-4}$ M solution had its threshold at 13.4 kV. No laser action was observed in a $1 \times 10^{-4}$ M solution pumping with a 14.5 kV intensty. By comparison, a $2 \times 10^{-4}$ M solution of Coumarin 30 in ethanol did exhibit laser action at 506 nm with a threshold at 6.7 kV. However, the Coumarin is well noted for its lack of photochemical stability.

Pulses were displayed on the storage oscilloscope and photographed. By measuring the area (integration) of the intensity-time curve, the relative intensities of the laser pulses were obtained. From comparisons it is apparent that syn-(methyl, methyl) bimane lases with about 1/3 less efficiency than does Coumarin 30 when both dyes were pumped at 12 kV. In solvents conventionally used to dissolve laser dyes, such as p-dioxane, ethanol, and dimethyl formamide, no lasing action was observed when pumped up to 14.5 kV. In all these solvents the fluorescence maximum was located in the 420–460 nm spectral region. However, lasing was observed in syn-(methyl, methyl) bimane in a $1 \times 10^{-3}$ M solution of hexafluoroisopropanol, where syn-(methyl, methyl) bimanes showed blue-green fluorescence, with an intensity maximum at 480 nm. Laser emission occurred at 501 nm with a threshold at 9.9 kV. In the $5 \times 10^{-4}$ M solution, however, pumping with up to 14.5 kV failed to produce laser action.

It is fairly clear from experiments that the T-T absorption band located at 490 nm is probably not much redshifted by changing the solvent.

The bimanes are a new class of laser dyes. By using different groups (for example, substitutes) for $R_1$ and $R_2$, one should be able to shift the T-T absorption band out of the fluorescence emission (laser action) region, or the fluorescence spectral region away from T-T absorption.

Higher efficiency resulting from the reduced T-T absorption combined with the high quantum efficiency of the bimanes, their good solubility in many solvents (including water), and their good photochemical stability should make these new laser dyes very competitive with the currently available laser dyes.

The main objective of these new syn-B laser dyes is to have the laser action spectral region of maximum intensity fall on the side of longer wavelengths of the strong T-T in absorption band located at about 480 nm, where only weak (or no) T-T absorption is present.

The advantages of moving the fluorescence (laser action region) into 500 nm plus region are merely to select an available solvent which red-shifts the lowest energy absorption band (and therefore also the fluorescence intensity maximum) much more than water, trifluoro ethanol and hexafluorescence such a solvent is selected so that it does not quench the fluorescence intensity.

Obviously, many modifications and variations of the present invention are possible in the light of the above teachings. It is therefore to be understood that within the scope of the appended claims the invention may be practiced otherwise than as specifically described.

We claim:

1. A lasing media in which the lasing compound has the following structure:

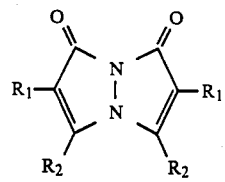

wherein this compound is abbreviated as:
  syn ($R_1$, $R_2$) bimane and $R_1$ and $R_2$ are chemical radicals.

2. A lasing media according to claim 1 in which the compound is dissolved in plastic.

3. A lasing media according to claim 1 in which the compound is present in a gaseous form.

4. A lasing media according to claim 1 in which the compound is dissolved in a liquid solvent.

5. A lasing media according to claim 4 in which the liquid solvent is water.

6. A lasing media according to claim 4 in which the liquid solvent is hexafluoroisopropanol.

7. A method of lasing in a laser cavity in the violet to red spectral region by pumping a laser dye media having present a compound with the structure:

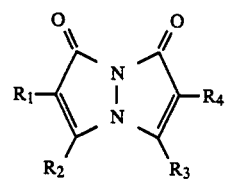

wherein the compound is abbreviated syn ($R_1$, $R_2$, $R_3$, $R_4$) bimane and $R_1$, $R_2$, $R_3$, $R_4$ are chemical radicals.

8. A lasing media according to claim 1 in which the concentrations are adjusted to improve lasing efficiency.

9. A method according to claim 8 in which the pumping is an optical pumping by a flashlamp.

10. A method according to claim 9 in which the compound is dissolved in plastic.

11. A method according to claim 9 in which the compound is present in gaseous form.

12. A method according to claim 9 in which the compound is dissolved in a liquid solvent.

13. A method according to claim 9 in which the liquid solvent is water.

14. A method of according to claim 9 in which the liquid solvent is hexafluoroisopropanol.

15. A method according to claim 8 in which the pumping is an optical pumping by a laser.

16. A method according to claim 15 in which the compound is dissolved in plastic.

17. A method according to claim 15 in which the compound is present in gaseous form.

18. A method according to claim 15 in which the compound is dissolved in a liquid solvent.

19. A method according to claim 15 in which the liquid solvent is water.

20. A method according to claim 15 in which the liquid solvent is hexafluoroisopropanol.

* * * * *